(12) United States Patent
Haddad et al.

(10) Patent No.: US 7,228,431 B2
(45) Date of Patent: Jun. 5, 2007

(54) AGGREGATED BINDING UPDATES AND ACKNOWLEDGMENTS IN MOBILE IPV6

(75) Inventors: Wassim Haddad, Verdun (CA); Suresh Krishnan, Westmount (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 768 days.

(21) Appl. No.: 10/644,987

(22) Filed: Aug. 21, 2003

(65) Prior Publication Data

US 2005/0044362 A1  Feb. 24, 2005

(51) Int. Cl.
*G06F 1/24* (2006.01)

(52) U.S. Cl. ............... 713/182; 713/155; 713/161; 713/163; 713/168

(58) Field of Classification Search ............... 713/182, 713/155, 161, 163, 168
See application file for complete search history.

(56) References Cited

U.S. PATENT DOCUMENTS

| | | | | |
|---|---|---|---|---|
| 5,528,605 | A | 6/1996 | Ywoskus et al. | 371/33 |
| 6,314,284 | B1 * | 11/2001 | Patel et al. | 455/417 |
| 6,487,602 | B1 * | 11/2002 | Thakker | 709/230 |
| 6,563,816 | B1 * | 5/2003 | Nodoushani et al. | 370/352 |
| 6,578,085 | B1 | 6/2003 | Khalil et al. | 709/241 |
| 6,614,774 | B1 * | 9/2003 | Wang | 370/338 |
| 2002/0009066 | A1 | 1/2002 | Shimizu et al. | 370/338 |

FOREIGN PATENT DOCUMENTS

| | | |
|---|---|---|
| EP | 1 117 231 | 7/2001 |
| EP | 1 259 026 | 11/2002 |

OTHER PUBLICATIONS

D. Johnson et al.: "Mobility Support in 1Pv6", draft-ietf-mobileip-ipv6-24.txt., IETF Mobile IP Working Group, Internet-Draft, expires on Dec. 29, 2003.
S. Glass et al., Registration Revocation in Mobile IPv4, Internet Engineering Task Force, Mobile IP Working Group, Internet Draft, Feb. 2003.
S. Okazaki et al., Securing MIPv6 Binding Updates Using Address Based Keys (ABKs), Internet Draft, Oct. 2002.
E. Perera et al., Extended Network Mobility Support, Nemo Working Group, Internet Draft, Jul. 29, 2003.
PCT Search Report dated Oct. 15, 2004 from corresponding application PCT/IB2004/051276.

* cited by examiner

*Primary Examiner*—Thomas Peeso
(74) *Attorney, Agent, or Firm*—Alex Nicolaescu; Ericsson Canada Inc.

(57) ABSTRACT

Methods and home agent for building a plurality of individual binding updates in the home agent on behalf of a mobile node. One of the methods and the home agent is directed to receiving an Aggregated Binding Update (ABU) at the home agent from the mobile node, building the plurality of individual binding updates from the ABU and sending from the home agent each of the plurality of individual binding updates toward each of the different destination addresses. Each of the plurality of individual binding updates has a different destination address, which is specified in the ABU. Another of the methods and the home agent is directed to intercepting a plurality of binding acknowledgments destined to the mobile node, building an Aggregated Binding Acknowledgment (ABA) from the plurality of binding acknowledgments and sending the ABA toward the mobile node.

18 Claims, 4 Drawing Sheets

| Aggregated Binding Update (ABU) A | | |
|---|---|---|
| $K_{bm1}$ | $BU_1$ | H1-address$_1$ |
| $K_{bm2}$ | $BU_2$ | MN2-address$_2$ |
| $K_{bm3}$ | $BU_3$ | S3-address$_3$ |

| Aggregated Binding Update (ABU) B | |
|---|---|
| $K_{bm1}$ | H1-address$_1$ |
| $K_{bm2}$ | MN2-address$_2$ |
| $K_{bm3}$ | S3-address$_3$ |

| Aggregated Binding Update (ABU) C | | |
|---|---|---|
| $CoT_1$ | $BU_1$ | H1-address$_1$ |
| $CoT_2$ | $BU_2$ | MN2-address$_2$ |
| $CoT_3$ | $BU_3$ | S3-address$_3$ |

| Aggregated Binding Update (ABU) D | |
|---|---|
| $CoT_1$ | H1-address$_1$ |
| $CoT_2$ | MN2-address$_2$ |
| $CoT_3$ | S3-address$_3$ |

| Aggregated Binding Acknowledgment (ABA) | |
|---|---|
| $BA_1$ | H1-address$_1$ |
| $BA_2$ | MN2-address$_2$ |
| $BA_3$ | S3-address$_3$ |

AGGREGATED BINDING UPDATES AND ACKNOWLEDGMENTS IN MOBILE IPV6

BACKGROUND OF THE INVENTION

1. Field of the Invention

The present invention relates to Binding Updates and Binding Acknowledgments in Mobile Internet Protocol version 6 (Mobile IPv6 or MIPv6).

2. Description of the Related Art

Internet and Internet Protocol (IP) were first built to ensure data transfer from one or more information servers to a fixed host. A lot of functionalities were then added in order to provide mobility to the still fixed host while accessing information stored in the servers. We are now faced with the challenges of having multiple ends of an IP communication all moving at the same time.

Mobile IP version 4 (Mobile IPv4, Mobile IP, MIPv4 or MIP) and the current version of MIPv6 are built to provide mobility to a host or Mobile Node (MN). The other nodes, usually referred to as Correspondent Nodes as (CN), are usually seen as fixed hosts. Reference is now made to the drawings where FIG. 1 shows a MIPv6 network architecture as suggested by the current MIPv6 specification found in an Internet Engineering Task Force (IETF)'s Internet draft named "draft-ietf-mobileip-ipv6-24", herein included by reference. As can be seen in FIG. 1, an IP network 100 comprises a MN 110 in communication with a CN 120 on a link 122. The link 122 is unlikely to be composed of only one direct physical connection, but rather represents a series of links between routing equipments transparently enabling the communication therebetween. The way the series of links is used to transport traffic between the MN 110 and the CN 120 is irrelevant as long as IP communication therebetween can be established.

The MN 110 has a permanently assigned home address valid in its home network 127, which home address is allocated upon initialization of the MN 110 in the home network 127. The allocation mechanism falls outside the scope of the present invention. The MN 110 is further in communication with a Home Agent (HA) 130 located in its home network 127. Among other functionalities, the HA 130 keeps record of a foreign address of the MN 110 valid outside the home network 127. The foreign address is called Care-of-Address (CoA) in the context of MIPv6. The CoA assigned to the MN 110 changes in time as the MN 110 moves from one network to another. The record kept by the HA 130, referred to as binding in the context of MIPv6, ties the CoA to the home address. A binding between the home address and the CoA is also kept in the CN 120 for the purpose of reaching the MN 110. The HA 130 is also responsible for routing traffic received at the home address to the MN 110. The traffic received is forwarded by the HA 120 on a link 125 toward the MN 110. All traffic sent on the link 125, in accordance with MIPv6, is encrypted to ensure, among other things, confidentiality of credentials periodically exchanged between the MN 110 and the HA 130. It should be noted that the MN 110 may have multiple home addresses and multiple CoA addresses and that a binding should be kept at the HA 130 for each pair of home address-CoA.

The following lines is an example of how the MIPv6 concept applies in a typical situation. For the benefit of the example, the MN 110 is in bidirectional IP communication with the CN 120 on the link 122. When the MN 110 moves from a first network to another, as illustrated by an arrow 135 on FIG. 1, the MN 110 receives a new CoA. This modification in addressing state of the MN 110 must be advertised to the CN 120 and the HA 130. Prior to the advertisement, the MN 110 must first make sure that the home address, which did not change, is still valid and that the newly acquired CoA address is usable to communicate with the CN 120. This assessment is done via a return routability (RR) test or procedure. The RR procedure also allows the creation of an authentication key. For this purpose, a Care-of init cookie and a home init cookie are built by the MN 110, also protecting the RR procedure from being spoofed.

The RR procedure starts at the MN 110, which sends a Home Test Init (HoTI) message through the HA 130, on the link 125, using its home address as the source address. The HoTI message contains the home test init cookie and is addressed to the CN 120. Upon reception of the HoTI message, the HA 130 forwards it to the CN 120 on a link 140. The link 140 has the same characteristics as the link 122. Simultaneously to sending the HoTI message, the MN 110 sends a Care-of Test Init (CoTI) message containing the Care-of Init cookie toward the CN 120 on the link 122 with its new CoA as the source address.

Upon reception of the CoTI message, the CN 120 replies with a Care-of Test (CoT) message addressed to the source address of the CoTI message (i.e. the MN's 110 new CoA) on the link 122. The CoT message contains the Care-of Init Cookie and a care-of keygen token generated by the CN 120. Upon reception of the HoTI message, the CN 120 replies with a HoT message addressed to the source address of the HoTI message (i.e. the MN's 110 home address) on the link 140. The HoT message contains the home Init Cookie and a home keygen token generated by the CN 120. Reception of the CoT and HoT messages at the MN 110 successfully completes the RR procedure. The MN 110 keeps the content of both the HoT And CoT messages and then continues with the advertisement of the modification of its CoA toward the CN 120 and the HA 130.

In order to advertise modification to its CoA, the MN 110 sends a first Binding Update (BU) message to the HA 130 on the encrypted link 125 containing the newly acquired CoA and other information related to the HA 130 binding. The detailed content of the BU as such is not related to the present invention. The HA 130 then updates its corresponding binding and replies to the MN 110 with a first Binding Acknowledgment (BA) indicating the successful update of the binding. The MN 110, after sending the first BU, uses the care-of keygen token and the home keygen token received earlier from the CN 120 to generate an authentication key $K_{bm}$ valid between the MN 110 and the CN 120. The authentication key $K_{bm}$ is commonly referred to as binding management key in the context of MIPv6. The MN 110 then creates a second BU similar to the first BU, signs it with the key $K_{bm}$ and sends it to the CN 120 on the link 122. The CN 120, upon reception of the second BU or before, generates the same key $K_{bm}$ using the tokens it already generated and further verifies the received second BU before updating its own related bindings. The CN 120 then creates a second BA, signs it using the key $K_{bm}$ and sends it, in accordance with the MIPv6 specification, on the link 125 toward the HA 130, but addresses the second BA to the MN 110. The HA 130 simply forwards the second BA to the MN 110. Reception of the second BA at the MN 110 indicates the successful completion of the advertisement of the modification.

In the example of FIG. 1, the MN 110 is in active information exchange with the CN 120 only. When multiple end points are present, advertisement of the modification involves the repetition of the previously described behavior.

More precisely, the RR procedure must first be performed with each of the end points. Similarly, an authentication key and a BU must be generated for each supplementary end point. Generated keys are then used to sign each BU prior to respectively sending them toward each supplementary end point.

As one skilled the art shall know, handheld devices usually have strictly limited processing capabilities. Since we are constantly progressing toward mobility, such handheld devices need to be able to use MIPv6 without problems. A key to the success of MIPv6 on such devices is then to limit the amount of processing required therefrom and, at the same, to free the available processing capabilities for quality of speech, image and so on. For MIPv4, attempts have been made to refrain the MN 110 from sending multiple BU to multiple end points. However, those attempts did not take into account encryption and authentication of the BU as required by MIPv6. In other words, the attempts could not comply with security concepts prescribed by the MIPv6 specification. As it can be appreciated, a solution to reduce the processing load of handled devices in the context of MIPv6 is needed.

The present invention provides such a solution.

SUMMARY OF THE INVENTION

A first object of the present invention is directed to a method for building a plurality of individual binding updates in a home agent located in an Internet Protocol (IP) network on behalf of a mobile node. The method comprises steps of receiving an Aggregated Binding Update (ABU) at the home agent from the mobile node, building the plurality of individual binding updates from the ABU and sending from the home agent each of the plurality of individual binding updates toward each of the different destination addresses. Each of the plurality of individual binding updates has a different destination address, which is specified in the ABU.

In an optional behavior of the first object of the present invention, the method may further comprise a step of signing each of the plurality of individual binding updates using one of a plurality of authentication keys included in the ABU prior to sending them.

In another optional behavior of the first object of the present invention, the method may further comprise steps of starting a timer after the step of sending the individual binding updates and intercepting at least one binding acknowledgment destined to the mobile node incoming from at least one of the destination addresses. Upon expiration of the timer, the method may further comprise a steps of building, at the home agent, an Aggregated Binding Acknowledgment (ABA) from the at least one binding acknowledgment and of sending the ABA toward the mobile node.

A second object of the present invention is directed to a method for aggregating binding acknowledgments in a home agent located in an Internet Protocol (IP) network for a mobile node. The method comprises steps of intercepting, at the home agent, a plurality of binding acknowledgments destined to the mobile node, building, at the home agent, an Aggregated Binding Acknowledgment (ABA) from the plurality of binding acknowledgments and sending the ABA toward the mobile node.

In an optional behavior of the second object of the present invention, the method may further comprise the step of verifying each of the plurality of binding acknowledgments using one of a plurality of previously generated authentication keys.

In another optional behavior of the second object of the present invention, the method may further comprise steps of receiving, at the home agent, a first binding update destined to the home agent from the mobile node prior to the step of intercepting the plurality of binding acknowledgments and starting a timer thereafter The method may then further comprise steps of sending the ABA toward the mobile node after expiration of the timer.

A third object of the present invention is directed to a home agent in an Internet Protocol (IP) network comprising a binding management module capable of building a plurality of individual binding updates from an Aggregated Binding Update (ABU) received from a mobile node, each of the plurality of binding updates having a different destination address specified in the ABU and building an Aggregated Binding Acknowledgment (ABA) from a plurality of binding acknowledgments intercepted from the destinations specified in the ABU.

In an optional behavior of the third object of the present invention, the binding management module of the home agent is further capable of building an Aggregated Negative Binding Acknowledgment (ANA) from at least one of negative binding acknowledgments intercepted from the destinations specified in the ABU.

In another optional behavior of the third object of the present invention, the binding management module of the home agent is further capable of sending each of the plurality of individual binding updates toward each of the different destination addresses starting a timer thereafter and sending the ABA toward the mobile node after expiration of the timer.

In yet another optional behavior of the third object of the present invention, the binding management module of the home agent is further capable of signing each of the plurality of individual binding updates prior to sending each of the plurality of individual binding updates toward each of the different destination addresses and verifying each of the plurality of binding acknowledgments intercepted from the destinations specified in the ABU prior to building the ABA.

Finally, in a last optional behavior of the third object of the present invention the binding management module of the home agent is further capable of generating a plurality of authentication keys, each of the plurality of authentication keys being generated by using a first keygen token previously intercepted from the destinations specified in the ABU and a second keygen token included in the ABU, each of the plurality of authentication keys being respectively linked to one of the destinations specified in the ABU.

BRIEF DESCRIPTION OF THE DRAWINGS

A more complete understanding of the present invention may be had by reference to the following Detailed Description when taken in conjunction with the accompanying drawings wherein:

FIG. 3A shows a first version A of an exemplary Aggregated Binding Update generated by a Mobile Node (MN);

FIG. 3B shows a second version B of an exemplary Aggregated Binding Update generated by a Mobile Node (MN);

FIG. 3C shows a third version C of an exemplary Aggregated Binding Update generated by a Mobile Node (MN);

FIG. 3D shows a fourth version D of an exemplary Aggregated Binding Update generated by a Mobile Node (MN);

FIG. 4 shows an exemplary Aggregated Binding Acknowledgment generated by a Home Agent (HA);

DETAILED DESCRIPTION OF THE PREFERRED EMBODIMENTS

The present invention provides functionalities in a Home Agent (HA) and a Mobile Node (MN) compatible with Mobile IP version 6 (MIPv6) to aggregate Binding Updates and Binding Acknowledgements. The teachings of the present invention encompass, among other things, generation of an aggregated binding update (ABU) in the MN, treatment of the ABU at the HA to create individual Binding Updates, interception and treatment of the Binding Acknowledgments related to the individual BU at the HA, generation of an aggregated binding acknowledgment (ABA) in the HA and reception of the ABA in the MN.

Figure 1:
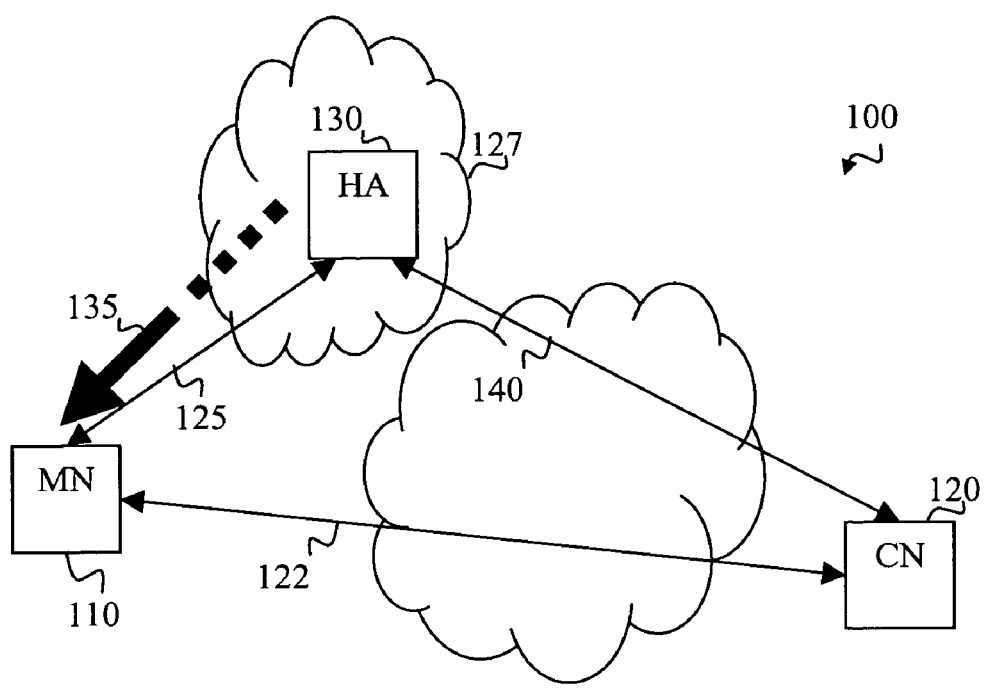
FIG. 1 is a prior art representation of a Mobile Internet Protocol version 6 architecture.
Figure 2:
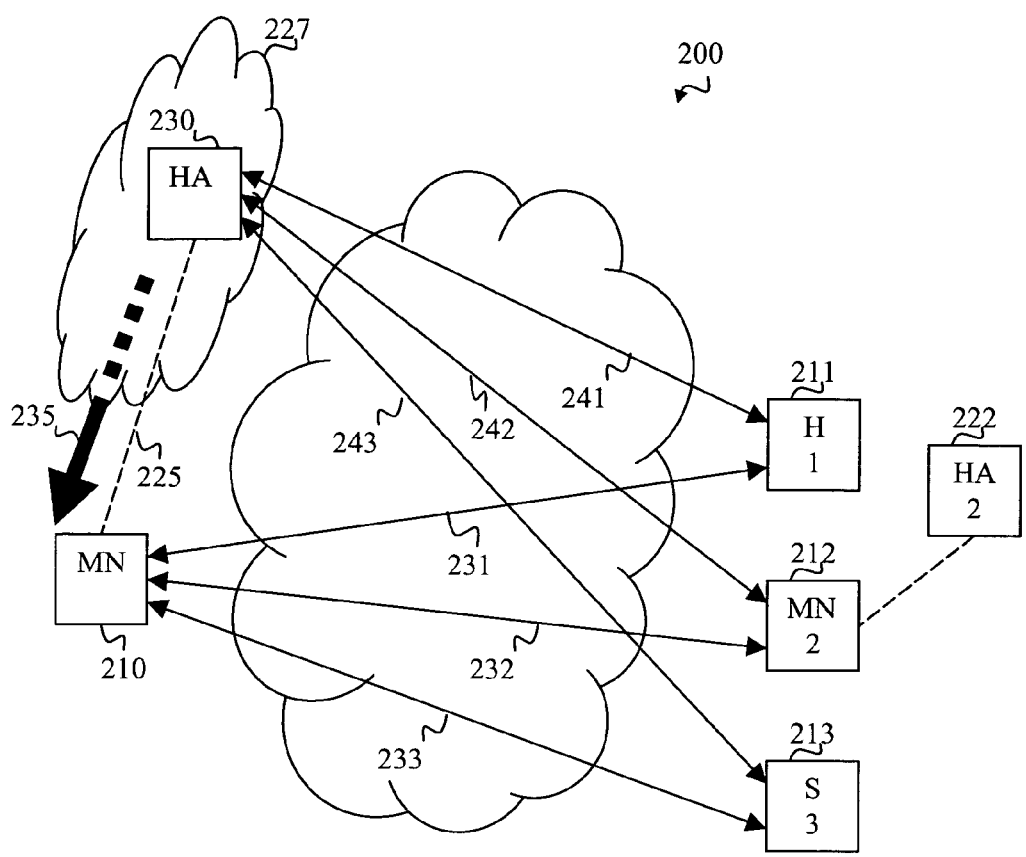
FIG. 2 shows an exemplary IP network compatible with Mobile Internet Protocol version 6 (MIPv6) wherein a Mobile Node (MN) is in IP communication with three other MTPv6-compatible hosts.

FIG. 2 shows an exemplary IP network 200 compatible with MIPv6 wherein a Mobile Node (MN) 210 is in IP communication with three other MIPv6-compatible hosts respectively Host 1 (H1) 211, Mobile Node 2 (MN2) 212 and Server 3 S3 213. The MN is also associated with a Home Agent (HA) 230 located in its Home Network 227. Communication between the MN 210 and the HA 230 is carried by an encrypted link 225. The MN 210 has a home address permanently assigned thereto and valid in the Home Network 227. The allocation mechanism falls outside the scope of the present invention. As mention earlier, the HA 230, as any MIPv6-compatible home agent, keeps all necessary bindings between the home address and at least one Care-of-Address (CoA) of the MN 210. The CoA assigned to the MN 210 changes in time as the MN 210 moves from one network to another. Bindings between the home address and the CoA is also kept in the three hosts H1 211, MN2 212 and S3 213 for the purpose of reaching the MN 210

The MN2 212 is a MIPv6-compatible host associated with a second also MIPv6-compatible Home Agent HA2 222. The IP communication between the MN 210 and the hosts H1 211, MN2 212 and S3 213 is respectively carried by the links 231, 232 and 233. It should be understood that the number of hosts may vary and the present invention is not limited nor influenced thereby. The term hosts should also be regarded as inclusive of all sorts of IP hosts such as handheld devices (cellular phones, Personal Digital Assistants (PDA), etc.), portable, fixed and server computers, etc.

The following lines is an example of how the new and innovative concept of the present invention applies in a typical MIPv6 situation. For the benefit of the example, the MN 210 is in bidirectional IP communication with the hosts H1 211, MN2 212 and S3 213 on the respective links 231, 232 and 233. When the MN 210 moves from a first network to another, as illustrated by an arrow 235 on FIG. 2, the MN 210 receives a new CoA. This modification in addressing state of the MN 210 must be advertised to the hosts Hi 211, MN2 212, S3 213 and to the HA 230. Prior to the advertisement, the MN 210 must first make sure that the home address, which did not change, is still valid and that the newly acquired CoA address is usable to communicate with the three hosts H1 211, MN2 212 and S3 213. The RR procedure has described earlier then takes place between the MN 210 and the H11 211, the MN 210 and the MN2 212 and between the MN 210 and the S3 213.

In an embodiment of the present invention, the HA 230, involved in all three RR procedures, may intercept and keep a copy of the three HoT messages (or portions therefrom) coming from the three hosts H1 211, MN2 212 and S3 213. The use of such HoT messages will be shown later on.

After the RR procedures, the MN 210 possesses all necessary information to generate the binding update (BU) toward the HA 230 and the three hosts H1 211, MN2 212 and S3 213. The MN 210 sends a first BU to the HA 230. The HA 230 updates its bindings and replies with a Binding Acknowledgment (BA). The HA 230 may further keep a copy of the first BU (or portions therefrom) for further use as shown later on. The MN 210, instead of sending three different BU to the three hosts H1 211, MN2 212 and S3 213, builds an Aggregated Binding Update (ABU) and sends it toward the HA 230.

Reference is now made concurrently to FIG. 2 and to FIGS. 3A to 3D. FIG. 3A shows a first version A of an exemplary ABU 310 generated by the MN 210. The version A of the ABU 310 is a concatenation of individual not yet signed BU (second column 312) together with addresses to which they are destined (third column 313). The version A of the ABU 310 further comprises authentication keys generated by the MN 210 (first column 311) and needed to sign the individual BU. The three columns 311-313 and their content may be referred to as parameters of the version A of the ABU 310.

Upon reception of the version A of the ABU 310, the HA 230 builds three different BU and sends them on behalf of the MN 210 to their respective destination address included in the version A of the ABU 310. In order to build the BU, the HA 230 splits the version A of the ABU 310 into its parameters. Each authentication key (from the column 311) is used to sign its respective individual BU (from the column 312) before sending them individually to their respective destination address (from column 313). The HA 230 uses links 241, 242 and 243 to respectively reach the three hosts H1 211, MN2 212 and S3 213.

FIG. 3B shows a second version B of an exemplary ABU 320 generated by the MN 210. The version B of the ABU 320 is a concatenation of authentication keys generated by the MN 210 (first column 321) and addresses to which individual BU are to be sent (second column 322). The version B of the ABU 320 does not comprise any individual BU. The two columns 321 and 322 and their content may be referred to as parameters of the version B of the ABU 320.

Upon reception of the version B of the ABU 320, the HA 230 builds three different BU and sends them on behalf of the MN 210 to their respective destination address included in the version B of the ABU 320. In order to build the BU, the HA 230 splits the version B of the ABU 320 into its parameters. The HA 230 uses the first BU received from the MN 210 prior to receiving the version B of the ABU 320 to create the three not yet signed individual BU. Each authentication key (from the column 321) is then used to sign the newly created individual BU (from the first BU) before sending them individually to their respective destination address (from column 322). The HA 230 uses the links 241, 242 and 243 to respectively reach the three hosts H1 211, MN2 212 and S3 213.

FIG. 3C shows a third version C of an exemplary ABU 330 generated by the MN 210. The version C of the ABU 330 is a concatenation of individual not yet signed BU (second column 332) together with addresses to which they are destined (third column 333). The version C of the ABU 330 further comprises CoT messages (or portions therefrom e.g. care-of keygen) received by the MN 210 during the RR procedures (first column 331) and needed to create the encryption keys. The three columns 331-333 and their content may be referred to as parameters of the version C of the ABU 330.

Upon reception of the version C of the ABU 330, the HA 230 builds three different BU and sends them on behalf of the MN 210 to their respective destination address included in the version C of the ABU 330. In order to build the BU, the HA 230 splits the version C of the ABU 330 into its parameters. Each CoT message (from the column 331) is used together with their respective HoT message from the three HoT messages kept by HA 230 during the previous RR procedures to generate three authentication keys. Since only the care-of and home keygen tokens are needed to generate the authentication key, the HA 230 may only keep those two portions of the CoT and HoT messages. Each authentication key thereby generated is then used to sign its respective individual BU (from the column 332) before sending them individually to their respective destination address (from column 333). The HA 230 uses the links 241, 242 and 243 to respectively reach the three hosts H1 211, MN2 212 and S3 213.

FIG. 3D shows a fourth version D of an exemplary ABU 340 generated by the MN 210. The version D of the ABU 340 is a concatenation of CoT messages (or portions therefrom e.g. care-of keygen) received by the MN 210 during the RR procedures (first column 341) and addresses to which individual BU are to be sent (second column 342). The version D of the ABU 340 does not comprise any individual BU. The two columns 341 and 342 and their content may be referred to as parameters of the version D of the ABU 340.

Upon reception of the version D of the ABU 340, the HA 230 builds three different BU and sends them on behalf of the MN210 to their respective destination address included in the version D of the ABU 340. In order to build the BU, the HA 230 splits the version D of the ABU 340 into its parameters. The HA 230 uses the first BU received from the MN 210 prior to receiving the version D of the ABU 340 to create the three not yet signed individual BU. Each CoT message (from the column 341) is used together with their respective HoT message from the three HoT messages kept by HA 230 during the previous RR procedures to generate three authentication keys. Each authentication key is then used to sign the newly created individual BU (from the first BU) before sending them individually to their respective destination address (from column 342). The HA 230 uses the links 241, 242 and 243 to respectively reach the three hosts H1 211, MN2 212 and S3 213.

FIGS. 3A, 3B, 3C and 3D show four different versions A 310, B 320, C 330 and D 340 of the ABU. It should be understood that other versions may be deducted from the present teachings without departing therefrom. Moreover, the order of the columns in the table should only be regarded as exemplary.

The result from each of the ABU's versions A 310, B 320, C 330 and D 340 is the same, i.e. the HA 230 uses the links 241, 242 and 243 to send the individual signed BU respectively to the three hosts H1 211, MN2 212 and S3 213. In a further embodiment of the present invention, the HA 230 starts a first timer after the last individual BU is sent. The first timer may also be started after reception of the first BU. The value of the timer maybe determined solely by the HA 230 or by a parameter included in the first BU or any versions of the ABU. Upon reception of the individual BU, the three hosts H1 211, MN2 212 and S3 213 each respectively replies with a $BA_1$, $BA_2$ and $BA_3$ addressed to the MN 210 but sent to the HA 230 as required by the MIPv6 specification. Upon interception of the three $BA_1$, $BA_2$ and $BA_3$, the HA 230 builds an Aggregated Binding Acknowledgment (ABA). In order to do so, the HA 230, after intercepting each BA, verifies the BA with the authentication key used for signing the individual BU related to the intercepted BA. The HA 230 then generates the ABA 400 from the verified BA and their address of origin as shown herein below.

FIG. 4 shows an exemplary ABA 400 as generated by the HA 230. The ABA 400 is composed of a first column 411 containing the received BA and a second column 412 containing the source of the BA. The HA 230 then sends the ABA 400 to the MN 210. If the HA 230 used the first timer earlier, the HA 230 sends the ABA 400 only for the BA received before the first timer expires. If, upon expiration of the first timer, the three $BA_1$, $BA_2$ and $BA_3$ are not received, the HA 230 sends the ABA 400 with all received BA and forwards all subsequent BA, if any, as required by the MIPv6 specification, without aggregating them.

In an optional embodiment of the present invention, the HA 230 keeps track of all sent BA, including any ABA, thus preventing aggregation of BA related to un-aggregated BU.

There exists an option in MIPv6 for passive acknowledgment of the BU. If the option is set this way by the MN 210 in the first BU, the HA 230 would reply thereto only if a problem was found in the first BU. Likewise, any version of the ABU may specify the option and prevent the three hosts H1 211, MN2 212 and S3 213 from replying to the individual BU with BA. In such a case, the HA 230 would use the same logical functioning to aggregate negative binding acknowledgment from the three hosts H1 211, MN2 212 and S3 213 before expiration of a second timer into a Aggregated Negative Binding Acknowledgment (ANA) and let any further negative binding acknowledgment pass by unaffected. Moreover, in some situations, the HA 230 may build both a ANA and a ABA since the MN 210 may specify different acknowledgment options in the different individual BU included in the ABU. The second timer, as the first one, may be specified by the HA 230 itself, or within the first BU or any version of the ABU.

Figure 5:
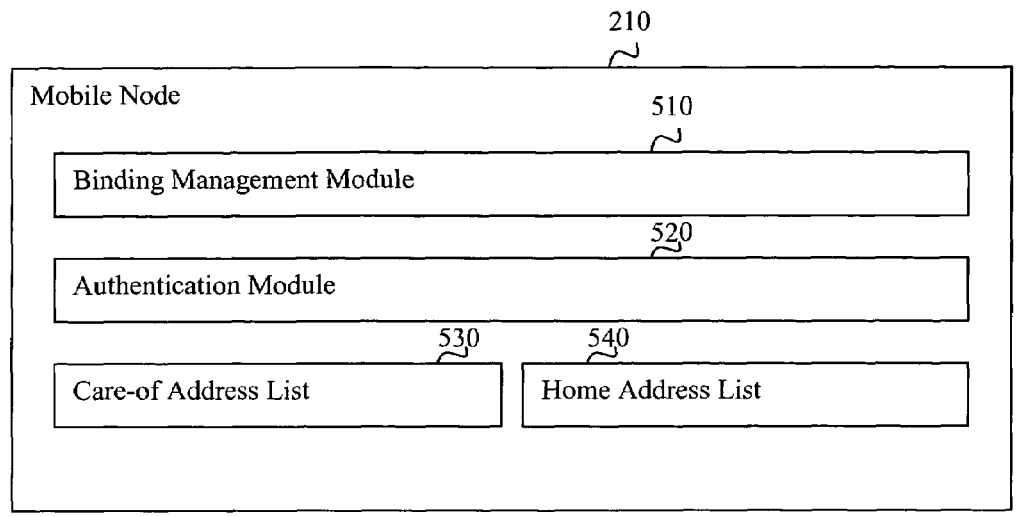
FIG. 5 shows a modular representation of a Mobile Node (MN) incorporating the new and innovative concepts of the present invention.

FIG. 5 shows a modular representation of the Mobile Node (MN) 210 incorporating the new and innovative concepts of the present invention. The MN 210 comprises a Binding Management Module 510, an Authentication Module 520, a Care-of Address List 530 and a Home Address List 540. The Binding Management Module 510 is capable of preparing at least one of the four versions of the ABU A 310, B 320, C 330 and D 340, as described with reference to in FIG. 3A-3D. It is further capable of setting, in optional embodiments, the first and second timers previously described. The Binding Management Module is yet further capable of receiving and treating the ABA 400 of FIG. 4. The Authentication Module 520 is capable of encrypting/decrypting traffic exchanged on the link 225 with the HA 230. It is further capable of managing the CoTI-CoT, HoTI-HoT messages, the init cookies, the keygen tokens and the authentication keys $K_{bm}$ derived therefrom. The Care-of Address List 530 is capable of maintaining the list of CoA assigned to the MN 210. The Home Address List 540 is capable of maintaining the list of Home Addresses assigned to the MN 210.

Figure 6:
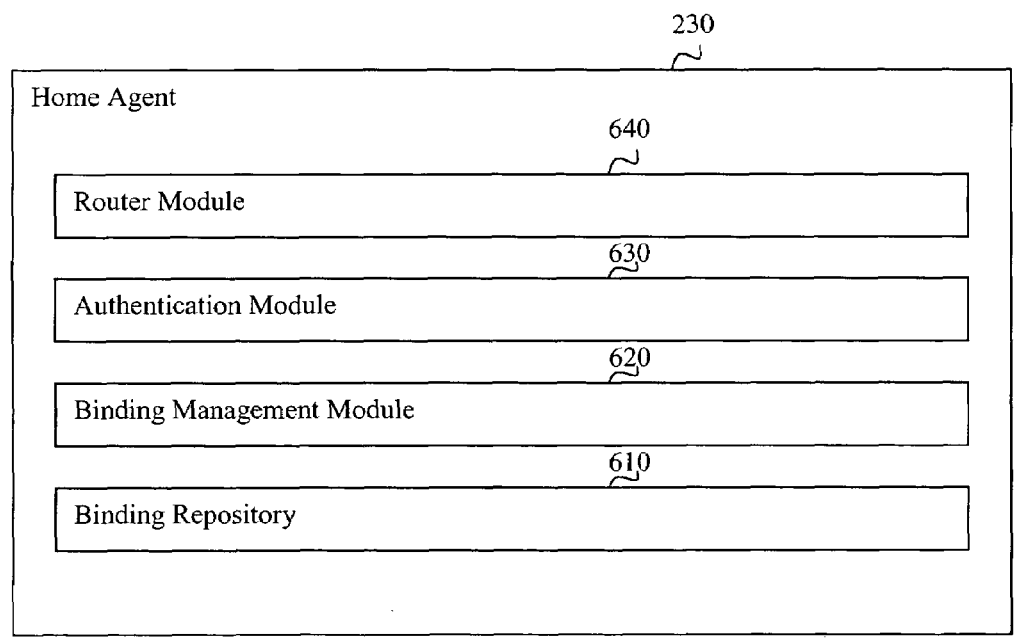
FIG. 6 shows a modular representation of a Home Agent (HA) incorporating the new and innovative concepts of the present invention.

FIG. 6 shows a modular representation of the Home Agent (HA) 230 incorporating the new and innovative concepts of the present invention. The HA 230 comprises a Binding Repository 610, a Binding Management Module 620, an Authentication Module 630 and a Router Module 640. The Binding Repository 610 is capable of keeping all bindings related to the MN 210 and, as can be readily understood, to other mobiles nodes. The Binding Management Module 620 is capable of building the ABA 400 as illustrated on FIG. 4. It is further capable of interpreting at least one of the four versions of ABU A 310, B 320, C 330 and D 340 and of further building the individual BU therefrom. The Authentication Module 630 is capable of encrypting/decrypting traffic exchanged on the link 225 with the MN 210. It is further capable of generating authentication keys from the intercepted HoT messages together with versions C 330 and D 340 of the ABU. The Router Module 640 is capable of forwarding the traffic received at the home address of the MN 210 thereto.

In the previous discussion, three hosts H1 211, MN2 212 and S3 213 are shown communicating with the MN 210. It should readily be understood that the number of hosts is not limited by the present invention. Likewise, the present invention is not influenced nor restricted by the number of hosts. Furthermore, all links 225, 231-233 and 241-243 should be regarded as logical connections between the elements rather than physical connection therebetween. They are, indeed, likely to represent a series of links connecting routing equipments. However, such connections do not affect the teachings of the present invention whatsoever.

The innovative teachings of the present invention have been described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others.

For instance, the inventive concepts of the present invention may be applied in other protocols or other contexts then MIPv6. In such implementations, the vocabulary used to describe the underlying concepts may not be the same. However, the present invention should not be interpreted with such lexical restrictions. For example, a Home Agent should be seen as a fixed node that a mobile can trust. The Home Agent may also be located outside the Home network as long as the trust relation therebetween can be established. Another example of general concept described with reference to MIPv6 is the concept of binding used in MIPv6 to represent a record linking two addresses of a further node. In that sense, a binding update should be seen as a message to update the record linking the two addresses. In the same vein, a binding acknowledgment should be seen as a confirmation message of the performed update of the record. Moreover, in other implementations, it may not be a necessity to sign the individual binding updates/binding acknowledgments and, therefore, such steps should be regarded as optional. In yet other implementations, it may be necessary to encrypt the individual binding updates/binding acknowledgments instead of signing them. In such implementations, the concepts described in the present invention can still be used by, for example, replacing authentication keys by encryption keys and steps of signing/verifying by steps of encrypting/decrypting.

In the drawings, like or similar elements are designated with identical reference numerals throughout the several views, and the various elements depicted are not necessarily drawn to scale.

What is claimed is:

1. A method for building a plurality of individual binding updates in a home agent on behalf of a mobile node, the home agent being located in an Internet Protocol (IP) network, the method comprising steps of:
   receiving an Aggregated Binding Update (ABU) at the home agent from the mobile node;
   building the plurality of individual binding updates from the ABU, each of the plurality of individual binding updates having a different destination address specified in the ABU; and
   sending from the home agent each of the plurality of individual binding updates toward each of the different destination addresses.

2. The method of claim 1 further comprising a step of, prior to the step of sending the individual binding updates, signing each of the plurality of individual binding updates using one of a plurality of authentication keys included in the ABU.

3. The method of claim 1 further comprises steps of:
   prior to the step of sending the individual binding updates, generating a plurality of authentication keys at the home agent, each of the plurality of authentication keys being generated by using a first keygen token previously intercepted and a second keygen token included in the ABU; and
   signing each of the plurality of individual binding updates using one of the generated authentication keys.

4. The method of claim 1 further comprises steps of, prior to the step of receiving the ABU, receiving, at the home agent, a first binding update destined to the home agent from the mobile node.

5. The method of claim 4, wherein the step of building the plurality of individual binding updates from the ABU further comprises a step of using the first binding update received from the mobile node to build the plurality of individual binding updates.

6. The method of claim 1 further comprising steps of:
   after the step of sending the individual binding updates, starting a timer; and
   intercepting at least one binding acknowledgment destined to the mobile node incoming from at least one of the destination addresses.

7. The method of claim 6 further comprising steps of:
   upon expiration of the timer, building, at the home agent, an Aggregated Binding Acknowledgment (ABA) from the at least one binding acknowledgment; and
   sending the ABA toward the mobile node.

8. The method of claim 6 further comprising steps of:
   upon interception of a binding acknowledgement incoming from each destination address specified in the ABU, building, at the home agent, an Aggregated Binding Acknowledgment (ABA) from the at least one binding acknowledgment; and
   sending the ABA toward the mobile node.

9. The method of claim 1 further comprising steps of:
   after the step of sending the individual binding updates, starting a timer;

intercepting, at the home agent, at least one negative binding acknowledgment destined to the mobile node incoming from at least one of the destination addresses;

upon expiration of the timer, building, at the home agent, an Aggregated Negative Binding Acknowledgment (ANA) from the at least one negative binding acknowledgment; and sending the ANA toward the mobile node.

10. A method for aggregating binding acknowledgments in a home agent for a mobile node, the home agent being located in an Internet Protocol (IP) network, the method comprising steps of:

intercepting, at the home agent, a plurality of binding acknowledgments destined to the mobile node;

building, at the home agent, an Aggregated Binding Acknowledgment (ABA) from the plurality of binding acknowledgments; and sending the ABA toward the mobile node.

11. The method of claim 10 further comprising the step of verifying each of the plurality of binding acknowledgments using one of a plurality of previously generated authentication keys.

12. The method of claim 10 further comprising steps of:

prior to the step of intercepting the plurality of binding acknowledgments, receiving, at the home agent, a first binding update destined to the home agent from the mobile node; and starting a timer thereafter.

13. The method of claim 12, wherein the step of sending the ABA toward the mobile node further comprises a step of sending the ABA toward the mobile node after expiration of the timer.

14. A home agent in an Internet Protocol (IP) network, the home agent comprising:

a binding management module capable of:

building a plurality of individual binding updates from an Aggregated Binding Update (ABU) received from a mobile node, each of the plurality of binding updates having a different destination address specified in the ABU; and building an Aggregated Binding Acknowledgment (ABA) from a plurality of binding acknowledgments intercepted from the destinations specified in the ABU.

15. The home agent of claim 14, wherein the binding management module is further capable of:

building an Aggregated Negative Binding Acknowledgment (ANA) from at least one of negative binding acknowledgments intercepted from the destinations specified in the ABU.

16. The home agent of claim 14, wherein the binding management module is further capable of:

sending each of the plurality of individual binding updates toward each of the different destination addresses;

starting a timer thereafter; and sending the ABA toward the mobile node after expiration of the timer.

17. The home agent of claim 14, wherein the binding management module is further capable of:

signing each of the plurality of individual binding updates prior to sending each of the plurality of individual binding updates toward each of the different destination addresses; and verifying each of the plurality of binding acknowledgments intercepted from the destinations specified in the ABU prior to building the ABA.

18. The home agent of claim 14, wherein the binding management module is further capable of:

generating a plurality of authentication keys, each of the plurality of authentication keys being generated by using a first keygen token previously intercepted from the destinations specified in the ABU and a second keygen token included in the ABU, each of the plurality of authentication keys being respectively linked to one of the destinations specified in the ABU.

* * * * *

UNITED STATES PATENT AND TRADEMARK OFFICE
CERTIFICATE OF CORRECTION

PATENT NO. : 7,228,431 B2  Page 1 of 1
APPLICATION NO. : 10/644987
DATED : June 5, 2007
INVENTOR(S) : Haddad et al.

It is certified that error appears in the above-identified patent and that said Letters Patent is hereby corrected as shown below:

On the Face Page, in Field (56), under "OTHER PUBLICATIONS", in Column 2, Line 1, delete "lPv6" and insert -- IPv6 --, therefor.

In Column 4, Line 62, delete "MTPv6-compatible" and insert -- MIPv6-compatible --, therefor.

In Column 5, Line 65, delete "Hi" and insert -- H1 --, therefor.

In Column 6, Line 5, delete "H11" and insert -- H1 --, therefor.

Signed and Sealed this

Second Day of September, 2008

JON W. DUDAS
*Director of the United States Patent and Trademark Office*